Aug. 24, 1943.   J. N. RELFE   2,327,458
TESTING SYSTEM
Filed Jan. 9, 1942   9 Sheets-Sheet 1

INVENTOR
J.N. RELFE
BY
ATTORNEY

INVENTOR
J.N. RELFE
BY
William R. Ballard
ATTORNEY

Aug. 24, 1943.   J. N. RELFE   2,327,458
TESTING SYSTEM
Filed Jan. 9, 1942.   9 Sheets-Sheet 3

INVENTOR
J.N.RELFE
BY
ATTORNEY

Aug. 24, 1943.   J. N. RELFE   2,327,458
TESTING SYSTEM
Filed Jan. 9, 1942   9 Sheets-Sheet 6

INVENTOR
J. N. RELFE
BY
William R. Ballard
ATTORNEY

Aug. 24, 1943.　　　J. N. RELFE　　　2,327,458
TESTING SYSTEM
Filed Jan. 9, 1942　　　9 Sheets-Sheet 9

INVENTOR
J. N. RELFE
BY
ATTORNEY

Patented Aug. 24, 1943

2,327,458

UNITED STATES PATENT OFFICE 2,327,458

TESTING SYSTEM

John Nicholson Relfe, Montgomery, Ala., assignor to American Telephone and Telegraph Company, a corporation of New York Application January 9, 1942, Serial No. 426,157

4 Claims. (Cl. 179—175.21)

This invention relates to testing systems provided for testing telephone lines in machine switching offices and particularly to apparatus provided for use in small offices generally known as community exchanges.

The object of the invention is to provide economical testing arrangements for use in offices where such arrangements will only be used occasionally and where the cost of the conventional testing equipment cannot be justified. In large offices it is usual to provide one or more test connectors which are at the disposal of repairmen but which are not used in regular service. The cost of such facilities cannot be justified in certain types of exchanges of limited capacity and so heretofore testing operations have had to be carried out by certain other old and well-known methods which were time consuming and in certain respects unsatisfactory. It is also known that connectors which are to be used in regular service may be appropriated by the testman and used for the purpose of testing the lines which may be reached thereby, but here again fairly elaborate testing facilities are at the testman's disposal, which testing facilities cannot be justified in one of these small offices.

In accordance with the present invention a single connector in the exchange is provided with an auxiliary circuit which will convert such connector to one suitable for testing purposes. The conversion is accomplished by a simple manually operable switch provided for that purpose and a signal lamp associated therewith will indicate the fact that the operation of the switch has or has not been effective. If the connector is busy in regular service then the operation of the switch will be ineffective until the connector is released. If the connector is idle then the operation of the switch will become effective and an artificial busy condition will be placed on its incoming terminals to prevent it being taken for regular service while it is being used for such test purposes.

A feature of the invention is a means for converting a regular service connector to a test connector under control of means which is effective only when such connector is idle.

Another feature is an auxiliary circuit for converting a connector to a special service device. Such auxiliary circuit is permanently associated with said connector and may be effectively connected into the circuit thereof by a manually operable switch only when said connector is idle.

Another feature of the invention is a switch and an associated signal for indicating the effectiveness of the operation of the switch. Where a regular connector is to be changed to a test connector the change cannot be made when the connector is busy in regular service and hence means are provided to prevent the operation of the changeover switch becoming effective under such conditions and a signal associated with the changeover switch will indicate the effectiveness of the operation thereof.

Other features will appear hereinafter.

The drawings consist of nine sheets of circuit diagrams. With Figs. 1 to 7 arranged as indicated in Fig. 10 a complete circuit diagram of a connection from a calling to a called telephone line may be traced. Fig. 1 shows a group of station line circuits and may be placed next to Fig. 2 to show the arrangement of these lines as calling lines or may be placed next to Fig. 7 to show the arrangement of these lines as called lines. Fig. 2 shows the arrangement of the line finder and its guard circuit. Figs. 3, 4, 5, 6 and 7 show the arrangement of the connector. Fig. 3 shows the conductors leading to the main part of the connector circuit. It includes a large broken line rectangle within which some of the conductors of Fig. 3 are shown interconnected by dotted lines and others ending without any connection made thereto. The circuits of Fig. 3 as it stands represent the regular connections in a connector circuit. Two other figures, 8 and 9, show auxiliary circuits and are of the exact size of the broken line rectangle of Fig. 3. When one of these circuits is fitted into this broken line rectangle the arrangement of the present invention is shown. These two alternative circuit arrangements show the changes and additions that must be made in a regular connector circuit to produce the test connector. Figs. 4, 5 and 7 show the detailed circuit of the connector. Fig. 6 shows details of the counting chain which is also part of the connector circuit. Fig. 8 is one and Fig. 9 is another auxiliary circuit for converting a connector to a test connector as above explained.

Fig. 1 which may be matched to either Fig. 2 or to Fig. 6 shows four line circuits and represents a plurality of groups each having a plurality of lines. The usual arrangement is to place these on a decimal basis and in accordance with this practice the four lines are numbered as extending to substations 11, 10, 01, and 00, being the first and last lines in the first and last groups in a one hundred line unit. Each line is provided with three relays, a line relay 1, a cut-off relay 2 and a lock-out relay 3 and each extends with its plus conductor 4, its minus conductor 5 and its private conductor 6 toward the right to linefinder terminals and toward the left to connector terminals.

When a station makes a call the line relay is operated and this simultaneously grounds three conductors, one of which, that numbered 7, is common to all the line relays and extends to an alarm circuit wherein the duration of the energization of the line relay is measured and reported if it endures beyond a predetermined time. The other two wires extend to group relays, one a tens group and the other a units group. The line relays ground these wires in accordance with the designation of the calling line. Thus line relay 1 grounds wires 8 and 9. Wire 8 may be traced to the G10 relay 12 in Fig. 2 and wire 9 may be traced through the contacts of the U10 relay 13 to the G1 relay 14. The G10 relay represents the tens group all of which start with the digit 1 and the G1 relay represents the digit 1 in the units group so that the two being simultaneously operated should signal the fact that line 11 is calling. The result of the operation of these two group relays will be further explained hereinafter.

It will also be explained hereinafter how the private wire 6 is grounded in the other circuits on either an incoming or outgoing call. It will be sufficient at present to note that on an incoming call from the line 11 the private wire 6 will be grounded when the line has been properly extended by a line finder and that on an outgoing call after the line has been tested and found idle the private wire 6 will be likewise grounded. Such a ground may be traced through the windings of both the cut-off relay 2 and the lock-out relay 3 to battery, and will result in the operation of both of these relays. The cut-off relay 2 will disconnect the windings of the line relay from the line and allow it to release in the case of an incoming call from the line. The lock-out relay is provided to prevent a line having certain trouble conditions from interfering with the normal functioning of the system. By way of example, let us suppose that the inner wire 5 is grounded. This would cause the line relay 1 to start a call. Through means which will be explained hereinafter a trial acceptance of the call will be made whereupon the cut-off relay 2 and the lock-out relay 3 will be operated and the line relay 1 will be released. But the call will be automatically rejected whereupon the ground for operating the relays 2 and 3 will be removed. The cut-off relay 2 will immediately release and again connect the line relay to the line wires. The lock-out relay is a slow-releasing relay and consequently the line relay 1 will again become operated before the lock-out relay 3 releases. Thereupon a locking circuit for relay 3 may be traced from battery, winding of relay 3, front contact and armature 1 of relay 3, front contact and armature 1 of relay 1, front contact and armature 2 of relay 1 to ground. The winding of cut-off relay 2 is short-circuited, since ground may be traced in one direction from the front contact and armature 1 of relay 3 to one terminal of relay 2 and in the other direction from ground armature 2 and front contact of relay 1, armature 2 and front contact of relay 3, the private wire 6 to the other terminal of relay 2. The cut-off relay thus allows the line relay to continuously respond to the grounded wire 5, but the lock-out relay 3 prevents the grounding of conductors 8 and 9 so that the relays of the guard circuit shown in the lower part of Fig. 2 are not operated. The alarm circuit wire 7 is grounded, however, to notify an attendant of a trouble condition. When the trouble condition is cleared, the line relay 1 will release and in due time thereafter the lock-out relay 3 will restore the line circuit to its normal condition.

Fig. 2 shows a guard circuit in the lower part of the drawing and the line-finder relays in the upper part of the drawing. The conductors running off the drawing in the upper right portion represent a link or connector circuit. Each link has individual to it a set of line-finder relays such as the relays 15 to 18, inclusive, and each line such as that represented by the wires 45 and 6 is multipled to as many relays such as 15 as there are links. Assuming that there are ten links (to serve one hundred lines) then there will be ten sets of relays 15 to 18.

Relays 15 and 16 represent the first and last of a set of ten relays each serving a differently numbered tens group of lines (relay 15 serves all lines whose tens digit is 1) and relays 17 and 18 represent the first and last of a set of ten relays for serving a differently numbered line connected thereto by the tens relays (relay 17 serves the line whose units digit is 1). It will be seen therefore that when relays 15 and 17 are operated that line numbered 11 is connected to the link shown.

Each link has a relay such as 19 individual thereto. An idle condition of the link will be denoted by a ground on conductor 20, and when the link is in condition for use the relay 19 will be operated and locked through resistance 21 to battery. Relay 19 represents the first link and relay 22 represents the last of the assumed ten links, and a chain circuit extends through their contacts which may be traced from the winding of relay 23 over conductor 24, the back contact and armature 3 of relay 22, thence through the corresponding contacts and armatures of the other similar relays, the back contact and armature 3 of relay 19 to ground. When this chain circuit is closed by finding all such relays as 19 and 22 restored to normal then relay 23 will be released. This relay is normally operated in a circuit through resistance 25, back contact and armature 2 of relay 26, similar contacts and armatures of the other units group relays, back contact and armature 2 of relay 14, resistance 27 to battery. It will also be noted that a ground as that applied over conductor 9 through the winding of the G1 relay 14 may be traced through armature 3 and back contact of relay 14, back contact and armature 2 of relay 28 to the chain circuit through the back contacts and armatures 2 of the units group relays, resistance 27 to battery, will act to release relay 23. Relay 23 is slow releasing and will not respond to such a connection unless it persists for a length of time that would indicate a trouble condition. The application of ground to the first described chain circuit by armatures 3 of the link relays 19 and 22 will cause the release of relay 23.

Relay 23 in releasing will connect battery through resistance 29, armature and back contact of relay 23 to conductor 30 which is multiplied to the back contact of armature 1 of all link relays such as 19 and 22. In all cases where the corresponding link is idle a ground will be found on the conductor such as 20 so that the relay corresponding to relay 19 will operate and lock in such position through a resistance such as 21 to battery. Thus each idle link when ready for use has its relay 19 operated. As soon as any one of the relays 19—22 is operated the chain is broken and relay 23 is again operated.

The operation of the other relays 28, 31 and 32 is not important for an understanding of the present invention. They comprise relays of the guard circuit which acts to automatically report trouble if certain circuit functions consume an undue length of time.

In a system of one hundred lines and ten links the relays such as 19 and 22 comprise a preference selector. Normally, if the link of Fig. 2 is available it will be taken for use immediately if a call comes in from a line whose units digit is 1. Thereby, the group relay 14 is operated so that conductor 33 is grounded. This leads to armature 2 of relay 19 so that if relay 19 is operated then multicontact relay 34 known as the gate relay is immediately operated. If relay 19 is not operated, indicating that this link is either busy or has been released since the last release of relay 23, then the ground on conductor 33 will be extended over the armature and back contact of relay 19 and in a chain of similar armatures and contacts until a relay similar to relay 19 which is operated is encountered, whereupon the companion multicontact relay is operated.

With the operation of the multicontact relay 34 the F relays (15 to 18) corresponding to the operated G relays (12, 14, 26) will operate through the contacts of relay 34. Thus the operation of the G10 relay 12 will be translated into the operation of the F10 relay 15, and the operation of the G1 relay 14 will be translated into the operation of the F1 relay 17. Relays 15 and 17 will then lock to the hold wire 35 which will remain grounded in the connector until release.

The operation of the gate relay 34 is transitory, for by its operation it connects the calling line to a link and this results in the operation of the cut-off relay 2 whereupon the line relay 1 releases. The group relays 12 and 14 are released and this in turn releases the gate relay 34.

There will be a period during this operation when the calling line will be connected to ground and battery both through the windings of the line relay and the battery feeding bridge relays of the connector. In order to assure the proper operation of these latter relays a local source of battery is connected to the positive wire of the connector during the transitory operation of relay 34. This may be traced from battery resistance 37, armature 3 and front contact of relay 23, armature and front contact of relay 34, positive conductor 38 to operate relay 39 in the connector.

The link or connector is shown in Figs. 3, 4, 5 and 6. In Fig. 3 certain conductors of the link enter a broken line rectangle into which either Fig. 8 or Fig. 9 may be fitted. With neither of these figures fitted into this rectangle the interconnections of the conductors entering this rectangle indicated by the dotted lines represents the normal connections of a regular connector— not equipped with the appliqué circuit which is the subject of the present invention. With either Fig. 8 or Fig. 9 inserted in the rectangle of Fig. 3 the interconnections indicated by dotted lines in Fig. 3 are the same while the appliqué circuit is not being used, so despite the fact that an appliqué circuit is connected into a connector the operation of the latter is identical with the operation of a regular connector.

The operation of the connector without the insertion of either Fig. 8 or Fig. 9 into Fig. 3 will first be described.

The purpose of the connector is to select the desired line and party in a group of lines, to test if this line is busy, to ring the desired party, using ten-party divided code ringing, and to complete the talking connection when the called party answers.

The selection of the desired line is accomplished in the connector by means of connector tens and units relays in a manner similar to that in the line finder. The connector tens relays are designated C10, C20, etc. and the connector units relays are designated C1, C2, C3, etc., the numbers bearing the same relation to the numbers as in the line finder.

When the calling subscriber dials the tens digit of the desired number, a relay counting chain or register records the number dialed and thereafter causes the selection of the ten line group containing the desired line, by operating the connector tens relay associated with that group. After the selection of the tens relay the counting chain is restored preparatory to the reception of the units digit of the called number.

When the units digit is dialed by the subscriber, the counting chain again records the digit dialed and causes the selection of the desired line in the previously selected ten line group, by operating the proper units relay. After the counting chain is again restored the "Party" digit is recorded when dialed.

If it is desired to ascertain which line is being called over a certain connector, it is only necessary to find which tens relay and which units relay is operated in the connector, their designations giving the number of the called line. The party being rung can be determined by noting the number of the party selection relay which is operated.

The connector circuit is designed for ten party divided code ringing, the code used consisting of ten different combinations of long and short ringing signals. It will be noted that in codes 1, 3, 5, 7 and 9 the ringing current will be applied to the negative side of the line; while in codes 2, 4, 6, 8 and 0 the ringing current will be applied to the positive side of the line. This permits the ringers to be wired for semiselective or non-selective ringing, as desired. In the first case the ringers are wired to ground, while in the second case they are bridged across the line.

The connector is arranged for four digit dialing. The first is a prefix digit which provides uniformity in numbering and is to all intents and purposes absorbed. The second digit will select a group of ten lines from the total number of lines. The third digit will select one line from the ten just selected and the fourth digit will select the proper ringing code for party lines.

The connector sends back a continuous tone generated in the tone circuit to the calling subscriber indicating that the apparatus is ready for dialing if a called line is busy, the connector sends back an interrupted tone to the calling subscriber to indicate that the line is busy. An audible ringing tone is sent back to the subscriber when the called line is being rung.

The connector is engaged by its associated line finder when a call is originated as described hereinbefore. To assure the holding of the connector after it has been seized, the B relay 39 is operated by means of a local circuit in advance of the closure of the circuit over the subscriber loop.

As soon as the line finder tens and units relays are operated, the connector will hold itself in an engaged position by closing the loop to the calling subscriber's line, and actuates its own delayed release circuit so that it will not release during dialing.

The connector sends out dial tone indicating that the circuit is ready for dialing. After the line selection digits have been dialed, the connector tests the desired line to determine if it is busy. If busy, busy tone is sent back to the calling line. If the desired line is idle, the connector prepares to ring the line with the proper code.

The connector continues to ring the called station until the called party answers, the calling subscriber hangs up, or the time disconnect feature releases the connection.

In case the called line is busy, the connector continues to send back busy tone until the calling subscriber hangs up, or the time disconnect feature releases the connection.

The connector is arranged to trip the ringing only during the silent period after the completion of a code train to avoid mutilation of the code signal.

When the line finder associated with the connector seizes a calling line a loop is established over the calling subscriber's line operating relays 39 and 40, in a circuit from battery, winding of relay 40, negative conductor 41, front contacts and armatures of units relay 17 and tens relay 15, negative conductor 5, line and station 11, positive conductor 4, armatures and front contacts of tens relay 15 and units relay 17, positive conductor 38, winding of relay 39 to ground. Relay 39 causes the operation of slow release relay 42 in a circuit from battery winding of relay 42, front contact and armature 1 of relay 39, armature and back contact of relay 43 to ground. When the connector is normal, ground is connected to conductor 20 to hold relay 19 operated as hereinbefore described. This ground may be traced from ground, back contact and armature 4 of relay 43, armature 1 and back contact of relay 39, armature 1 and back contact of relay 42, armature 2 and back contact of relay 44, armature 2 and back contact of relay 45, armature 1 and back contact of relay 46, conductor 47, to conductor 20. This circuit is opened by the operation of relay 39 and is held open by the slow release relay 42 until the connector is released.

The operation of relay 39 establishes a connection to the dial tone circuit, from battery, winding of relay 45, back contact and armature 3 of relay 50, conductor 51, negative conductor 52, negative conductor 53, back contact and armature 2 of relay 54, armature and back contact of relay 55, armature 1 and back contact of relay 56, front contact and armature 2 of relay 39, armature 6 and back contact of relay 57 to busy tone lead 58. The resistance of the circuit through the dial tone apparatus is too high to cause the operation of relay 45. Dial tone is now sent over the calling line indicating to the subscriber that the equipment is ready for dialing.

When the dial is operated, the dialing relay releases and reoperates a number of times corresponding to the number dialed. Relay 39 functions as the dialing relay. For example, when digit "2" is dialed, the circuit for relay 39 will be broken and remade twice, when digit "0" is dialed the circuit for relay 39 is broken and remade ten times. The contacts of relay 39 close and open a circuit to relays 50 and 59 which in turn open and close a circuit to the counting chain relays which register the number of ground pulses sent.

The counting chain consists of ten counting relays 61 to 70, inclusive, together with the three sequence relays 69, 71 and 72. When relay 39 first releases it closes a circuit to operate relays 59 and 50. The circuit for relay 59 may be traced from ground, back contact and armature 4 of relay 43, armature 1 and back contact of relay 39, armature 1 and front contact of relay 42, winding of relay 59 to battery, and in parallel with the winding of relay 59, through the back contact and armature 1 of relay 59 through the winding of relay 50 to battery. Both these relays operate, but relay 50 is faster than relay 59 and will have fully operated before its circuit is broken by armature 1 of relay 59. The winding of relay 50 is normally shunted with a resistance 73 and when relay 59 operates another resistance 74 of lower value is connected across the winding of relay 50. These shunting resistances make relay 50 somewhat slow in releasing and the relay remains operated for a short period after relay 59 has become operated. During this period a ground pulse is transmitted to the counting chain. When relay 39 reoperates the relay 59 releases and reestablishes the circuit for relay 50. In this manner relays 50 and 59 operate and release under control of the dialing relay 39.

When relay 50 operates it establishes a circuit for relay 75, from battery, armature 1 and back contact of relay 44, winding of relay 75, back contact and armature 3 of relay 76, front contact and armature 1 of relay 50, armature 4 and back contact of relay 43 to ground. Relay 75 is slow to release and will therefore remain operated as long as the train of pulses continues, the circuit for its energization just traced being intermittently closed. At the end of the train of pulses relay 75 releases.

Relay 50 in operating also closes a circuit for the first counting relay 61 as follows, from battery armature 1 and back contact of relay 44, winding of relay 61, back contact and armature 1 of relay 72, back contact and armature 1 of relay 71, back contact and armature 3 of relay 76, front contact and armature 1 of relay 50, armature 4 and back contact of relay 43 to ground. Relay 61 operates and prepares a holding circuit for itself in series with sequence relay 72, but this is ineffective as long as the direct operating ground on the winding of relay 61 is extended over one of the front contacts and thus keeps relay 72 shunted. When relay 50 releases, terminating the first pulse, the shunt on relay 72 is removed and this relay operates in series with relay 61 holding the latter locked up. This circuit may be traced from battery, armature 1 and back contact of relay 44, winding of relay 61, armature 1 and front contact of relay 61, winding of relay 72, back contact and armature 3 of relay 71, armature 2 and back contact of relay 46, front contact and armature 3 of relay 42 to ground. Sequence relay 72 shifts the counting circuit from relay 61 to relay 62 over the front contact of armature 1 of relay 72 and the front contact and armature 6 of relay 61.

When the second dial impulse causes the release of relay 39, and the operation of relays 50 and 59 a path is closed to operate counting relay 62, from battery, armature 1 and back contact of relay 44, winding of relay 62, armature 6 and front contact of relay 61, front contact and armature 1 of relay 72, back contact and armature 1 of relay 71, back contact and armature 1 of relay 60, back contact and armature 3 of relay 76, front contact and armature 1 of relay 50, armature 4 and back contact of relay 43 to ground. Relay 62 operates and prepares a holding circuit for itself in series with sequence relay 71, similar to the above-described circuit for relays 61 and 72. At the end of the second impulse relay 71 operates in series with relay 62, holding the latter locked up. This circuit may be traced from battery, armature 1 and back contact of relay 44, winding of relay 62, armature 2 and front contact of relay 62, winding of relay 71, back contact and armature 3 of relay 60, armature 2 and back contact of relay 46, front contact and armature 3 of relay 42 to ground. Sequence relay 71 shifts the counting circuit from relay 62 to relay 63 over the front contact of armature 1 of relay 71 and the front contact and armature 6 of relay 62, and opens the circuit of relays 61 and 72 at the back contact of armature 3 of relay 71 causing both relays to release.

The third dial impulse closes a circuit for relay 63, from battery, armature 1 and back contact of relay 44, winding of relay 63, armature 6 and front contact of relay 62, front contact and armature 1 of relay 71, back contact and armature 1 of relay 60 and thence over the circuit previously traced to the ground on the back contact of armature 1 of relay 43. Relay 63 operates and prepares a holding circuit for itself in series with sequence relay 60. When ground is removed, relay 60 operates and locks in series with relay 63 to the ground on armature 3 of relay 42. Sequence relay 60 shifts the counting circuit from relay 63 to relay 64 over the front contact of armature 1 of relay 60 and the front contact and armature 6 of relay 63, and opens the circuit of relays 62 and 71 at the back contact of armature 3 of relay 60 causing both relay 71 and 62 to release.

The fourth dial pulse closes a path to operate relay 64, from battery, armature 1 and back contact of relay 44, winding of relay 64, armature 6 and front contact of relay 63, front contact and armature 1 of relay 60, back contact and armature 3 of relay 76, front contact and armature 1 of relay 50, armature 4 and back contact of relay 43 to ground. Relay 64 operates and prepares a holding circuit for itself in series with sequence relay 72. At the end of the fourth impulse, relay 72 operates and locks in series with relay 64, from battery, armature 1 and back contact of relay 44, winding of relay 64, armature 1 and front contact of relay 64, winding of relay 72, back contact and armature 3 of relay 71, armature 2 and back contact of relay 46, front contact and armature of relay 42 to ground. Sequence relay 72 opens the circuit of relays 63 and 60 at armature 3 and back contact of relay 72, causing both relays to release. With relay 60 released and relays 72 and 64 energized, a circuit is prepared for relay 65, which is energized by the next dial impulse, from battery, armature 1 and back contact of relay 44, winding of relay 65, armature 6 and front contact of relay 64, front contact and armature 1 of relay 72, back contact and armature 1 of relay 71, back contact and armature 1 of relay 60, back contact and armature 3 of relay 76, front contact and armature 1 of relay 50, armature 4 and back contact of relay 43 to ground. At the end of the ground pulse, relay 71 is energized in series with relay 65, causing the release of relays 64 and 72.

This sequence of operations is continued as long as dial impulses cause the release and reoperation of relay 39 or until the end of the chain is reached at the completion of the tenth impulse.

On a pulse arriving, the counting relay is operated. At the end of the pulse the counting relay is locked in series with the proper sequence relay, which shifts the counting path to the next counting relay.

| Pulse | 1 | 2 | 3 | 4 | 5 | 6 | 7 | 8 | 9 | 0 |
|---|---|---|---|---|---|---|---|---|---|---|
| Counting relay operated | 61 | 62 | 63 | 64 | 65 | 66 | 67 | 68 | 69 | 70 |
| Sequence relay operated | 72 | 71 | 60 | 72 | 71 | 60 | 72 | 71 | 60 | 72 |

Registration of prefix digit

The prefix digit "2" is now dialed. The counting chain functions in the regular manner and relays 62 and 71 will be operated. In the manner described relay 75 will be operated in response to this train of pulses and will release an appropriate interval thereafter. The release of relay 75 closes a circuit for the operation of relay 57. With relay 62 the only counting chain relay operated at this time a circuit may be traced from battery, winding of relay 57, armature 5 and front contact of relay 62, back contact and armature 5 of relay 77, back contact and armature 2 of relay 75, back contact and armature 4 of relay 56, armature 3 and back contact of relay 75, front contact and armature 3 of relay 71, armature and back contact of relay 46, front contact and armature 3 of relay 42 to ground. The operation of relay 57 opens the dial tone circuit and closes circuits for the pick-up interrupter and the motor start lead.

Relay 44 now operates to release the counting chain. The circuit may be traced from battery, winding of relay 44, resistance 78, back contact and armature 6 of relay 77, front contact and armature 5 of relay 57 to ground. Counting relay 62 and relay 71 now release due to the removal of battery by armature 1 of relay 44. As a result of the release of relay 62, relay 57 locks in series with relay 77, which in turn opens the circuit for and releases relay 44. Relay 77 will not operate before the release of the counting chain because of a ground shunt through armature 5 of relay 62.

Tens selection

The tens digit, for example "2," is now dialed. The counting chain functions in the regular manner and relays 62 and 71 will be operated. When relay 75 releases a circuit will be closed for the connector tens relay 79, over a circuit from battery winding of relay 79, armature 3 and front contact of relay 62, front contact and armature 5 of relay 77, back contact and armature 2 of relay 75, back contact and armature 4 of relay 56, armature 3 and back contact of relay 75, front contact and armature 3 of relay 71 to the ground on armature 3 of relay 42. Relay 69 operates and closes a circuit for relay 44, from battery, winding of relay 44, resistance 78, back contact and armature 2 of relay 56, front contact and armature 3 of relay 79 to ground. Relay 44 energizes and removes battery from the counting chain at the back contact of armature 1 of relay 44, releasing the counting relay and its associated sequence relay. This opens the operating path for relay 79 but a locking path has been established therefor through the armature 1 and front contact of relay 79, winding of relay 80, and thence to ground at the front contact and armature 3 of relay 42. Relay 80 will connect battery through resistance 81 to relay 56 to cause its operation. As long as the counting relay 62 was operated a ground shunt was placed around relay 80 to hold it and relay 56 in an unoperated condition. The shunt having been removed by the release of the counting relay consequent to the operation of relay 44 relay 80 operates in series with relay 79 and causes the operation of relay 56. It should be noted that tens relays 79 and 82 control groups of lines equipped for divided ringing and that their locked operation involves the relay 80. Tens relay 83, however, serves a group of lines equipped for bridged ringing and consequently this relay locks in series with relay 56 rather than in series with relay 80. With the bridged ringing arrangement relay 80 does not operate.

Relay 56 by its operation releases relay 44 by opening its circuit at the back contact of armature 2 of relay 56. Relay 56 prepares a circuit for the operation of the units relay, which occurs following the next train of dial pulses. When a digit other than 2 is dialed the circuit functions in a similar manner. Each counting relay operates its associated tens relay upon the release of relay 75. The counting chain is released by the operation of relay 44.

Units selection

At this stage the ten line group which contains the desired line has been selected by the operation of the proper tens relay. With the release of the operated counting and sequence relays and of relay 44, the counting chain has been restored to its normal condition preparatory to the reception of the units digit.

When the units digit is dialed, the counting chain operates as previously described for the registration of the tens digit. At the end of the train of dial impulses, relay 75 releases as above described. This closes a path for the operation of the proper units relay as determined by the setting of the counting chain.

Assuming that the units digit 1 is dialed, counting relay 61 is operated in series with sequence relay 72. A path is closed to operate connector units relay 85, from battery winding of relay 85, armature 4 and front contact of relay 61, back contact and armature 3 of relay 84, front contact and armature 4 of relay 56, armature 3 and back contact of relay 75, front contact and armature 3 of relay 72, armature 2 and back contact of relay 46, front contact and armature 3 of relay 42 to ground. Relay 85 operates thereby selecting the first line of the previously selected ten line group, or in other words, line 21.

Relay 44 operates from ground through a connector units relay contact, removing battery from the counting chain and sequence relays, and restoring these relays to normal. The circuit may be traced from battery, winding of relay 44, resistance 78, back contact and armature 2 of relay 84, armature 2 and front contact of relay 85 to ground. On the operation of relay 44 the shunt around relay 84 through the counting chain is removed and relay 85 holds over a locking path in series with relay 84, from battery winding of relay 85, front contact and armature 1 of relay 85, winding of relay 84, armature 2 and back contact of relay 46, front contact and armature 3 of relay 42.

Busy test

As soon as the connector units relay 85 operates and before relay 84 is energized, a circuit is closed from relay 86 to the test wire of the called line. If the called line is busy ground will be on the test wire and this will cause the energization of relay 86. The test wire of the called line in the example given will be at the front contact of armature 7 of relay 79 and this may be traced through the front contact and armature 3 of relay 85, armature 1 and back contact of relay 84, upper winding of relay 86 to battery. Relay 86 closes a holding circuit for itself over its lower winding and remains operated until the calling party hangs up, or until released by the time disconnect means. The holding circuit may be traced from battery, resistance 87, armature 3 and front contact of relay 86, lower winding of relay 86, front contact and armature 3 of relay 42 to ground.

Relay 86 in operating opens the circuit of relay 55 at the back contact of armature 3 of relay 86, to prevent the operation of relay 55 and thereby to keep the talking circuit open to the called line. Busy tone is connected to the calling line to indicate that the called line is busy, from a source of busy tone, through the front contact and armature 2 of relay 86, front contact and armature 1 of relay 55, back contact and armature 2 of relay 55, armature 2 and back contact of relay 54 to negative conductor 53 whence it is transmitted to the calling station in the usual manner. This is the signal for the calling subscriber to hang up and to repeat the call after a reasonable interval, unless the call is for another party on the same line with the calling subscriber as will appear hereinafter.

If the called line is idle there will be no ground on the test wire and relay 86 will not energize when the connector units relay operates. With relay 86 remaining deenergized, the operation of relay 84 places ground on the test wire of the called line, making the called line busy to other calls and operating its lock-out relay and cut-off relay thereby disconnecting the line relay. The circuit may be traced from ground, resistance 38, back contact and armature 1 of relay 86, front contact and armature 1 of relay 84, armature 3 and front contact of relay 85, armature 7 and front contact of relay 79 to the test wire of the called line and through the winding of the cut-off and lock-out relays thereof to battery. The operation of relay 84 also closes a circuit for relay 55, from battery, resistance 87, armature 3 and back contact of relay 86, winding of relay 55, front contact and armature 2 of relay 84, armature 2 and front contact of relay 85 to ground. Relay 55 closes the line circuit to the called line through its armatures 1 and 2 and by its armature 3 prepares the ringing circuit.

Registration of the party digit

At this stage the tens and units relays have been operated by the tens and units digits, respectively, dialed by the calling subscriber, thereby selecting a called line. The next digit dialed is the party digit, which selects the code to be run on the line for the selection of the desired party.

The relay 39 responds to the dial impulses of the party digit operating the counting chain as already described. At the end of this train of impulses, the counting relay last operated locks in series with a sequence relay. It does not release because the circuit of the reset relay 44 is held open at the back contact and armature 2 of relay 56 and the back contact and armature 2 of relay 84.

Ringing

Assuming that the party code 1 has been dialed counting relay 61 and sequence relay 72 will be operated. The connector and ringing interrupter are designed to permit a line to be rung with ten different codes. The armatures 2 of the counting relays 61 to 70, inclusive, are shown bracketed and leading to a set of ringing code interrupters. These are not shown since their construction and function is well understood. They consist of means to place on these various conductors ground pulses of long and short duration in various combinations.

When relay 75 releases at the end of the fourth train of pulses a path is closed for the operation of relay 76 from battery, resistance 89, winding of relay 76, armature 4 and back contact of relay 76, front contact and armature 3 of relay 84, front contact and armature 4 of relay 56, armature 3 and back contact of relay 75, front contact and armature 3 of relay 72, armature 2 and back contact of relay 46, front contact and armature 3 of relay 42 to ground. Relay 76 locks over a path from battery, resistance 89, winding of relay 76, armature 4 and front contact of relay 76, armature 2 and back contact of relay 46, front contact and armature 3 of relay 42 to battery.

With relay 76 operated the path for further impulses into the counting chain is opened at armature 3 and back contact of relay 76.

Assuming that the station code 1 has been dialed counting relay 61 will be operated. Its associated sequence relay 72 will also be operated.

In this system the ringing machine is arranged to be started only when a connector has been seized and the tens digit has been dialed. This is indicated by the label "motor start" reached by armature 3 of relay 57. When the tens digit has been registered and relay 56 has been operated a circuit may be traced from ground, armature 3 and front contact of tens relay 79, armature 2 and front contact of relay 76, front contact and armature 3 of relay 57 to the motor start lead 90. The code ringing interrupter now sends out ground impulses periodically in accordance with the selected code over the leads connected to armatures 2 of the counting chain relays. These impulses correspond in length and in number to the long and short rings of the selected code.

Relays 91 and 92 will operate in response to the ground signal sent over these leads as required by the connections to be made. The relay 91 operates on the even codes connecting the ringing current over the positive wire. A circuit may be traced from battery, winding of relay 91 to the front contacts of armatures 2 of counting chain relays 62, 64, 66, 68 and 70 and thence to the ringing interrupter. Upon each operation of relay 91, relay 92 will be operated in a circuit from battery, winding of relay 92, armature 3 and front contact of relay 91, armature 2 and back contact of relay 46, front contact and armature 3 of relay 42 to ground. Relays 91 and 92 operate closing the ringing circuit to the line. When both these relays operate this circuit may be traced from a source of ringing current 93 through the front contact and armature 1 of relay 91, the front contact and armature 1 of relay 92, front contact and armature 1 of relay 54, armature 1 and front contact of relay 55, to the positive conductor leading to the called line. The manner in which relay 54 is operated will be described hereinafter.

Should one of the odd numbered counting relays be operated, then only relay 92 will be operated and ringing current will therefore be extended from the source 93 over the back contact and armature 2 of relay 92, front contact and armature 1 of relay 54, armature 2 and front contact of relay 55 to the negative conductor of the called line. Relay 80 and armature 3 of relay 46 serve to send the ringing current out on both sides of the line on reverting calls when divided ringing is used, as will be described hereinafter. On the odd codes relay 92 operates from leads to the ringing conductor putting the ringing current out on the negative wire as heretofore described.

At the same time that the code signals are sent out to operate the relays 91 and 92 battery is placed on the pick-up lead by the ringing interrupter to operate relay 54. The pick-up lead makes it impossible to start the ringing at any time except at the beginning of a code. The relay 54 will hold up during the ringing of the code over the ringing hold lead. To safeguard it against release there is an auxiliary path over the front contact and armature 3 of relay 92 to battery through resistance 94 to hold relay 55 while relay 92 is placing the ringing current in code on the line. The ringing of the called line continues until the called subscriber answers, the calling party relinquishes the call, or until the time disconnect feature functions. To prevent mutilation of the code the ringing can be stopped only during the silent period after the completion of the code train. Lifting the receiver operates relay 95 which opens the ground feed to the pickup and ringing hold leads at armature 4 and back contact of relay 95.

Called party answers

When relay 54 releases following a code ring, the circuit is prepared for answer. By lifting the receiver at the called station relay 95 operates in a circuit from battery, winding of relay 45, back contact and armature 3 of relay 50, conductor 51, conductors 52, negative conductor 53, and thence over the loop of the called subscriber's line back to the positive conductor 98, conductor 97, winding of relay 95 to ground. Relays 45 and 95 form the battery feed bridge for the called subscriber and correspond to relays 40 and 39 which form the battery feed bridge for the calling subscriber. Relay 95 having operated relay 44 responds in a circuit from battery, winding of relay 44, armature 4 and front contact of relay 95, front contact and armature 3 of relay 55, front contact and armature 2 of relay 72 (it was assumed in this case that counting relay 61 and sequence relay 72 were operated) front contact and armature 2 of relay 76, front contact and armature 2 of relay 56, front contact and armature 3 of relay 79, to ground. Relay 44 having operated, battery is removed from the counting chain which now releases.

The release of the operated counting relay and its associated sequence relay opens the operating path of relay 44 which thereupon releases after an interval.

Release of connection

The release of the connection in the normal case of a completed call is controlled by the calling line. When the receiver is replaced at the calling station it opens the line loop thereby causing the release of relay 39 which in turn opens the circuit of the slow releasing relay 42. The release of relay 42 removes ground from the holding conductor 96 and the private conductor 97 of the link which are controlled by armature 3 of relay 42 thereby causing the release of the line finder and also the cut-off relay of the calling line. Ground is again connected to the conductor leading to relay 19 from ground, back contact and armature 4 of relay 43, armature 1 and back contact of relay 39, armature 1 and back contact of relay 42, armature 2 and back contact of relay 44, armature 2 and back contact of relay 45, armature 1 and back contact of relay 46, conductor 47, conductor 20 to the winding of relay 19.

The release of relay 42 also removes ground from the connector relays causing them to release and in turn to release the cut-off relay of the called line which immediately causes a lockout as described in the line finder description if the called party has not already hung up. When the called party hangs up before the calling party relays 95 and 42 will release but the connector will be held by the calling party.

In the case of an attempted call which finds the wanted line busy the release of the line finder and the calling cut-off relay occurs as above, but the release of the connector is accomplished in a different manner in order to facilitate the identification of reverting calls as will be explained hereinafter.

When a busy line is called relay 46 is energized after the party digit is dialed and held from ground on the test wire of the called line in a circuit from the ground on such test wire, the armature 1 and front contact of relay 84, armature 1 and front contact of relay 86, armature 2 and front contact of relay 42, armature 4 and back contact of relay 48, front contact and armature 5 of relay 76, winding of relay 46 to battery. Ground is now extended from the front contact and armature 2 of relay 46 to substitute for the release of relay 42 on a reverting call. If the called line is still busy after the calling party hangs up a ground on the called test wire persists until after release of relay 42. After the calling subscriber replaces his receiver relay 42 releases as described in the normal release operation. The original circuit of relay 46 is now opened at back contact and armature 2 of relay 42, but before it can release a holding circuit for it is established which includes a make contact of relay 46 and a break contact of relay 42. This circuit may be traced from the front contact and armature 1 of relay 46 through the back contact and armature 2 of relay 45, back contact and armature 2 of relay 44, back contact and armature 1 of relay 42, back contact and armature 1 of relay 39, armature 4 and back contact of relay 43 to ground. At the same time relay 42 in releasing connects the winding of relay 44 to the test wire of the called line which has just been disconnected from relay 46. The ground on this test wire energizes relay 44. This may be traced from ground on the test wire through the front contact and armature 7 of relay 79, front contact and armature 3 of relay 85, armature 1 and front contact of relay 84, armature 1 and front contact of relay 86, armature 2 and back contact of relay 42, winding of relay 44 to battery. Relay 44 operates and opens at its back contact and armature 2 the circuit for relay 46 and relay 46 releases opening its holding circuit so that the subsequent release of relay 44 will not cause relay 46 to again operate. The connector then releases in the normal manner.

If the called line becomes idle before the calling party hangs up the ground on the called test wire vanishes before the release of relay 42 causing relay 46 to release. Then when the release of relay 42 occurs the holding circuit for relay 46 is not established since this circuit includes a make contact of relay 46 itself. Relay 44 is not energized when it is connected to the test wire, but the energization of relay 44 is not necessary in this case. The connector thereafter releases in the normal manner.

Cancellation of preliminary impulse

If there is a swinging short on the line, or if the receiver is "jiggled" a preliminary impulse is sent which, if not corrected, will give rise to wrong numbers as it corresponds to dialing "1." The connector is therefore equipped with a preliminary impulse release feature by which the connector registers an initial digit 1 and thereupon proceeds to cancel it.

When a false impulse is received in this way relays 61 and 72 operate. When relay 75 releases a path is closed to operate relay 44 from battery, winding of relay 44, resistance 78, armature 5 and front contact of relay 61, back contact and armature 4 of relay 77, back contact and armature 4 of relay 56, armature 3 and back contact of relay 75, armature 3 and front contact of relay 72, armature 2 and back contact of relay 46, front contact and armature 3 of relay 42 to ground. Relay 44 operates removing battery from the counting chain and releases relays 61 and 72. The counting chain is now restored to normal.

Reverting service

A reverting call, that is, a call from one party to another on the same line, is distinguished from all other calls by the fact that the line finder and the connector both make connection to the same line and ground found by the connector on the test wire or private conductor of the called line vanishes at the same instant that relay 42 releases, removing the ground from the test wire of the calling line which is also the called line.

Assuming that a station on line 11 makes a call to another station on the same line and that the first, second and third digits of the called station's number have been dialed, the busy test is made in the usual manner and relay 85 is operated. The busy tone is sent out but the called station directory number is completed by the subscriber dialing the complete directory number including the party digit.

The counting and sequence relays, and relay 75 operate in the usual manner. When relay 75 releases, relay 76 is operated and ground is placed on the motor start lead. The circuit from the pick-up lead through the back contact of armature 3 of relay 54 is not established, however, as relay 55 has not operated, the circuit for it being held open at the back contact of armature 3 of relay 86. The call, so far, has proceeded in the usual way as a call to a busy line.

After the subscriber has dialed the party digit the receiver is replaced and the relay 39 releases. This is followed by the release of relay 42. Relay 42 connects relay 44 to the test wire of the called line, but the ground having been removed from the test wire when relay 42 released, relay 44 will not operate. This distinguishes the reverting call from an ordinary call to a busy line.

Relay 46 has operated as previously described. Relay 46 in closing a circuit from ground on its front contact to its armature 2, substitutes the ground removed by the release of relay 42, and holds the counting chain and sequence relays operated. Presently, the relay 86 releases, being dependent for its locking circuit on ground at the front contact of armature 3 of relay 42. The release of relay 86 establishes a circuit from ground, resistance 88, back contact and armature 1 of relay 86, front contact and armature 1 of relay 84, armature 3 and front contact of units relay 85, armature 7 and front contact of tens relay 79 to the test or private wire of the called line. This ground reoperates the cut-off relay and makes the line busy. The release of the relay 86 also operates relay 55 from battery, resistance 87, armature 3 and back contact of relay 86, winding of relay 55, front contact and armature 2 of relay 84, armature 4 and front contact of units relay 85 to ground. The operation of relay 55 closes the circuit of relay 54, from battery (not shown) on the pick-up interrupter lead, through armature 2 and front contact of relay 57, back contact and armature 3 of relay 54, winding of relay 54, back contact and armature 4 of relay 95, front contact and armature 3 of relay 55, front contact and armature 2 of sequence relay 72, front contact and armature 2 of relay 76, front contact and armature 2 of relay 56, front contact and armature 3 of tens relay 79 to ground. Relay 54 in operating switches its armature 3 from the pick-up lead to the armature 3 of the ringing relay 92 whose front contact leads through resistance 94 to battery and whose back contact leads to the ringing hold interrupter. Through this well-known arrangement mutilation of code ringing signals is avoided because ringing cannot start until the pick-up interrupter has signaled the start of a code and ringing cannot stop until the ringing code interrupter has signaled the end of a code.

The connector is arranged to ring the code on both sides of the line on reverting calls on lines arranged for divided ringing in order to give an indication to the calling party of when the called party answers, in cases where the called and calling stations are not rung on the same side of the line. In case of bridged ringing the code is rung over one side of the line as on a call from one line to another with return to ringing ground in the connector.

When the arrangements for both bridged and divided ringing are provided for party lines, the lines requiring divided ringing are segregated in groups of tens lines and the relay 80 must be provided. Thus, in the showing, the ten lines reached by the tens relay 79 and the ten lines reached by the tens relay 82 are equipped for divided ringing while the ten lines reached by the tens relay 83 are arranged for bridged ringing. When a call is made to a line in the group reached by the tens relay 79, relay 80 operates in series with the connector tens relay in a similar manner as relay 56 is ordinarily operated in series with the connector tens relay during the tens selection as previously described. The circuit may be traced from battery, connector tens relay 79, front contact and armature 1 of relay 79, winding of relay 80, back contact and armature 2 of relay 46, front contact and armature 3 of relay 42 to ground. In this case relay 56 is operated locally from relay 80. This circuit may be traced from battery resistance 81, armature 2 and front contact of relay 80, winding of relay 56, armature 2 and back contact of relay 46, front contact and armature 3 of relay 42 to ground.

On reverting calls relay 46 operates as usual and if the reverting call is made on a line arranged for divided ringing the relay 80 will also be operated and ringing current is supplied from the source 93 through the front contact and armature 1 of relay 80, the front contact and armature 3 of relay 46 to the contacts of relay 91 to the side of the line to which the called station ringer is connected. In case a reverting call is made on a line in a tens group arranged for bridged ringing, relay 80 will not be operated and the ringing return ground will be supplied through the back contact and armature 1 of relay 80.

When the called party answers or when the calling party relinquishes the call by a momentary lifting of the receiver, relays 45, 95 and 44 are energized and thereafter relays 54 and the operated counting relay and associated sequence relay are released. Relay 44 opens the holding circuit of relay 46 causing the latter to release and thereby terminating the reverting call condition of the connector and causing its release.

*Trunk service*

The connector may be arranged for trunk service but since this arrangement is not involved in the present invention no description thereof will be given. It will be sufficient to note that certain leads in the drawings which apparently have no functions are used for trunk service, for instance, the back contact and armature 4 of relay 84 and armature 2 of relay 77 as well as relay 48 are concerned with trunk service.

*Time disconnect*

The time disconnect feature regularly furnished in conjunction with this connector performs the following functions:

(1) Disconnects permanent signals.
(2) Disconnects lines established on regular connections and left to ring for an excessively long time.
(3) Disconnects busy signals left up for an excessively long time.
(4) Disconnects reverting calls left in the ringing position without answer for an excessively long time.

Since the time disconnect features play no part in the present invention they will not be described in detail. It will merely be noted that the relays 100, 101, 102 and 103 are involved in this connection. The leads ending at the bottom of the broken line rectangle in the lower left-hand corner of Fig. 4 go to timing, tone and alarm circuits. The timing circuit normally applies ground to leads 104 and 105 while leads 106 and 107 are normally open. At intervals of two minutes the timing circuit first interrupts on lead 105 and then lead 104 for a few seconds. When ground is restored to lead 105 a brief impulse of ground is applied to leads 106 and 107 successively, the latter causing relay 102 to operate momentarily. Further description of the time disconnect features is believed to be unnecessary.

*Conversion of regular connector to test connector*

Fig. 8 is an auxiliary test circuit for converting a regular connector to a test connector. This figure may be bodily placed within the broken line rectangle of Fig. 3 and when so placed it will be noted that the connections indicated by dotted lines in Fig. 3 are established while this auxiliary test circuit is in its normal idle condition. For instance, the connection between conductors 20 and 47 indicated by the dotted line in Fig. 3 is now established by connections through the normal contacts of armature 1 of relay 110 and the connection between conductors 52 and 53 is established by the connection through the back contact and armature 2 of relay 111 while the connection between conductors 97 and 93 is established through the back contact and armature 1 of relay 111. Likewise the connection from the resistance 49 to the conductor 99 is established through the armature 5 and back contact of relay 112.

This circuit is intended for use in link type community dial offices for testing subscribers' lines equipped with lock-out relays. Use is made of a regular link or connector circuit converted to a test connector to operate in conjunction with a special testing circuit. The modifications required in the link do not alter its performance as a regular connector when not in use as a test circuit. Supplementary testing features for use with line circuits equipped with lock-out relays are provided.

The functions of the circuit of Fig. 8 may be listed as follows:

(1) It provides means whereby a given link circuit can be converted to a test connector for use with the local testing circuit and means for restoring the link to service as a regular link or connector.
(2) It prevents the link conversion if the link is busy on a subscriber's connection.
(3) It indicates that the link is busy by a flashing lamp after the test connector control key is operated.
(4) It indicates that the link is in the testing condition by a steady burning lamp.
(5) It guards the link from seizure by a subscriber's line circuit when in the testing condition.
(6) It provides for connecting the testing circuit to the test connector.
(7) It provides for connecting the test telephone to the test connector.
(8) It provides for furnishing talking battery supply to the called line.
(9) It provides for code ringing to the called station.
(10) It provides for manual divided ringing on a non-selective basis without ground to enable ringing party line stations with receivers off the hook.
(11) It provides for automatic monitoring on a busy line.
(12) It provides a busy indication by means of a flashing lamp to indicate that a busy line or lines on lock-out has been encountered.
(13) It provides for removing a line from lock-out by means of a lock-out remove key.
(14) It provides for opening the third wire (private or sleeve) of a line circuit by means of "3W0" key and permits the cut-off relay and lock-out relay to release and the subsequent operation of the line relay, seizure of the line by a link and enables the tester to dial on the line under test.
(15) It provides for unlocking a non-dial or restricted line to the test connector.
(16) It prevents ringing on a busy line.
(17) It prevents testing current from reaching a busy line.
(18) It prevents busy tone from reaching a busy line.

*Detailed description of operation*

Figure 1:
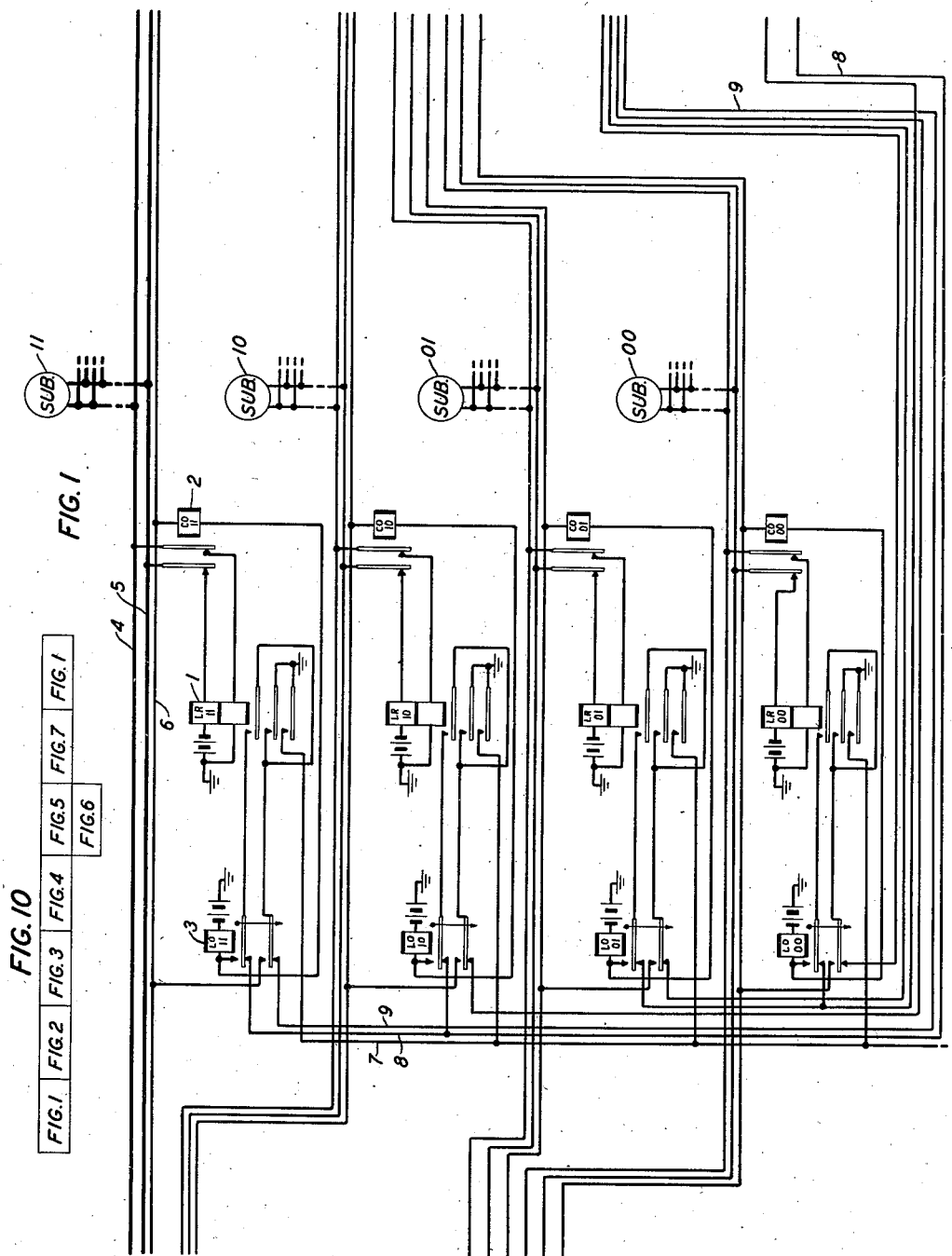
Figure 2:
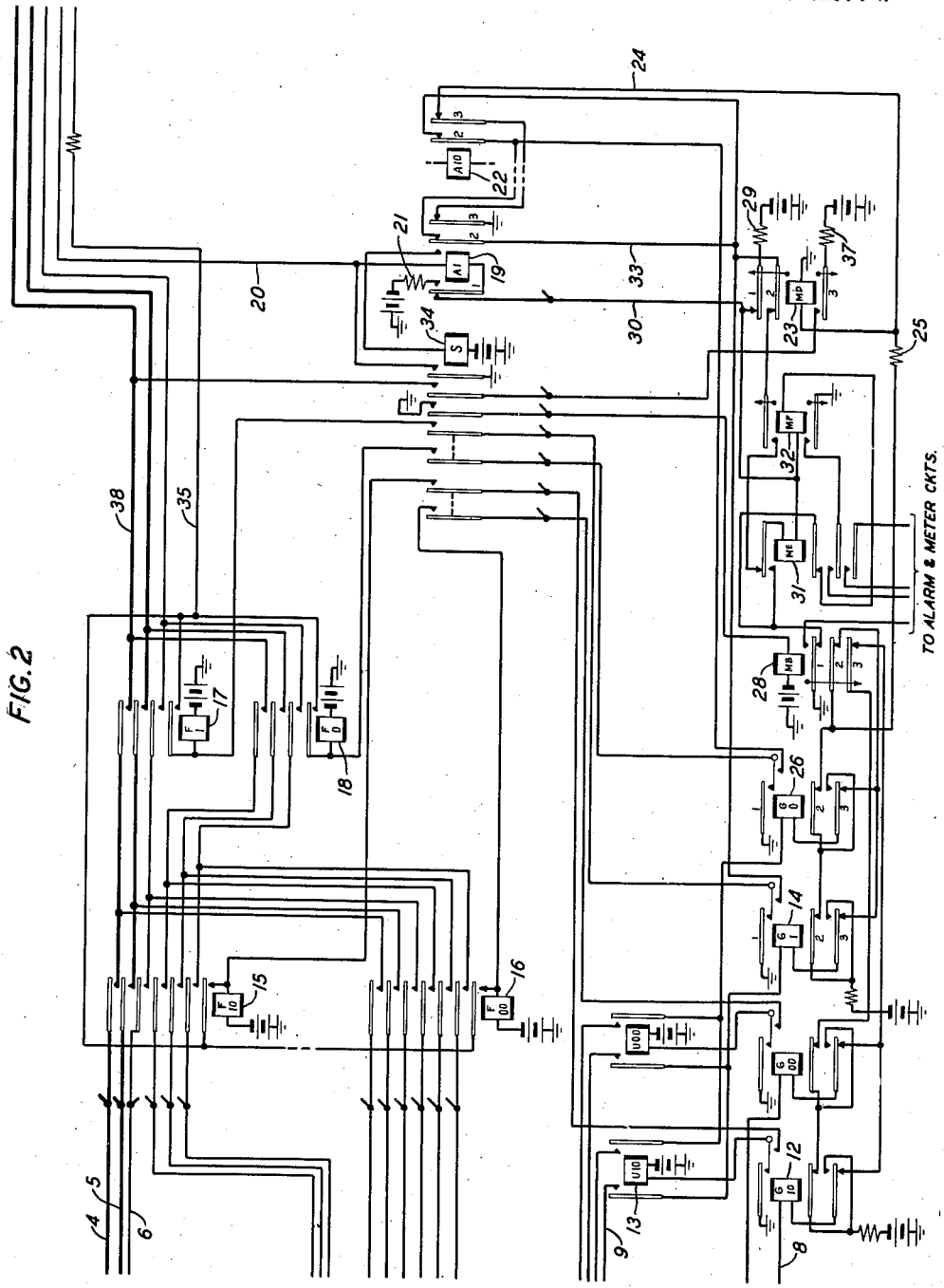
Figure 3:
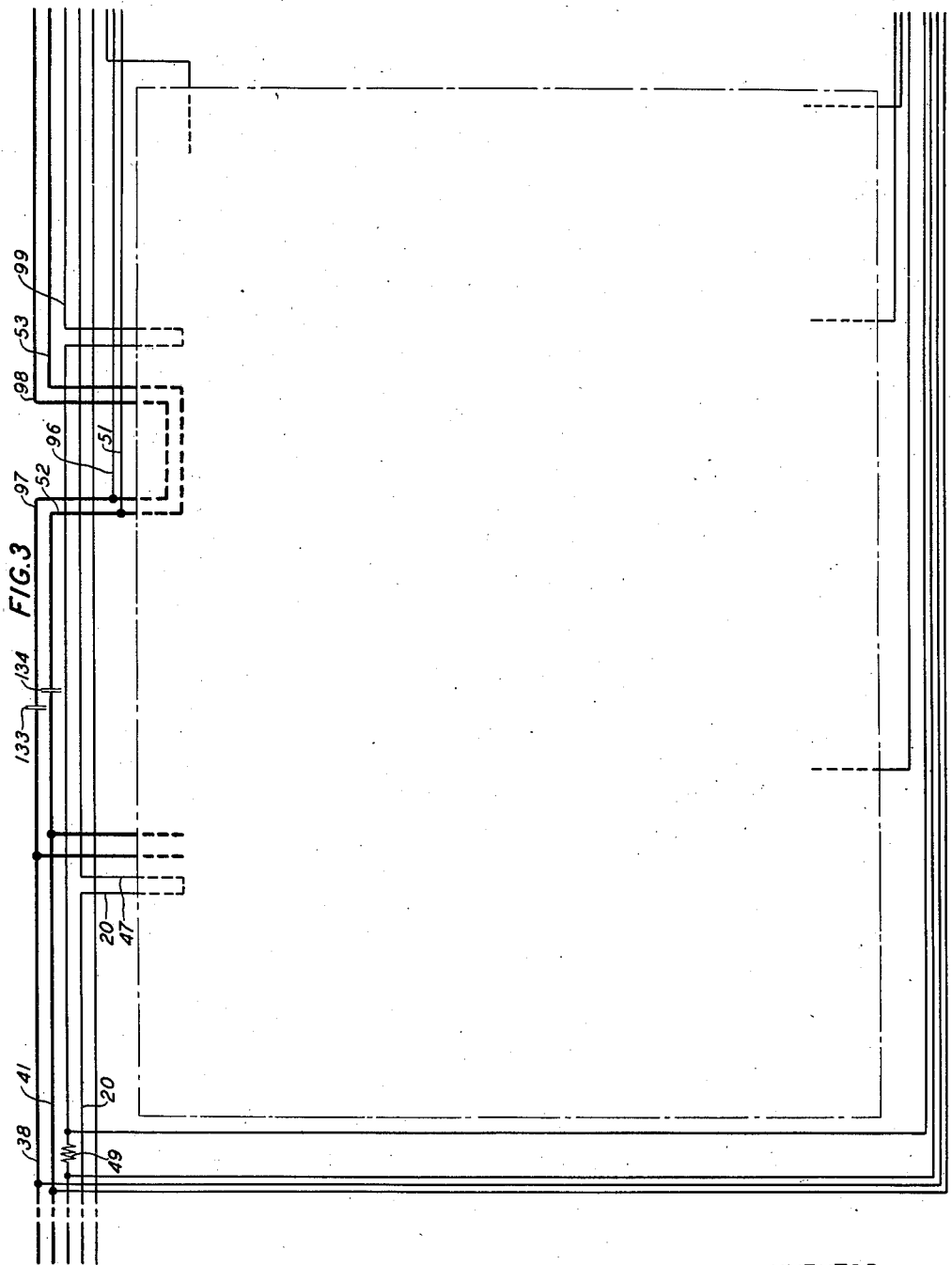
Figure 4:
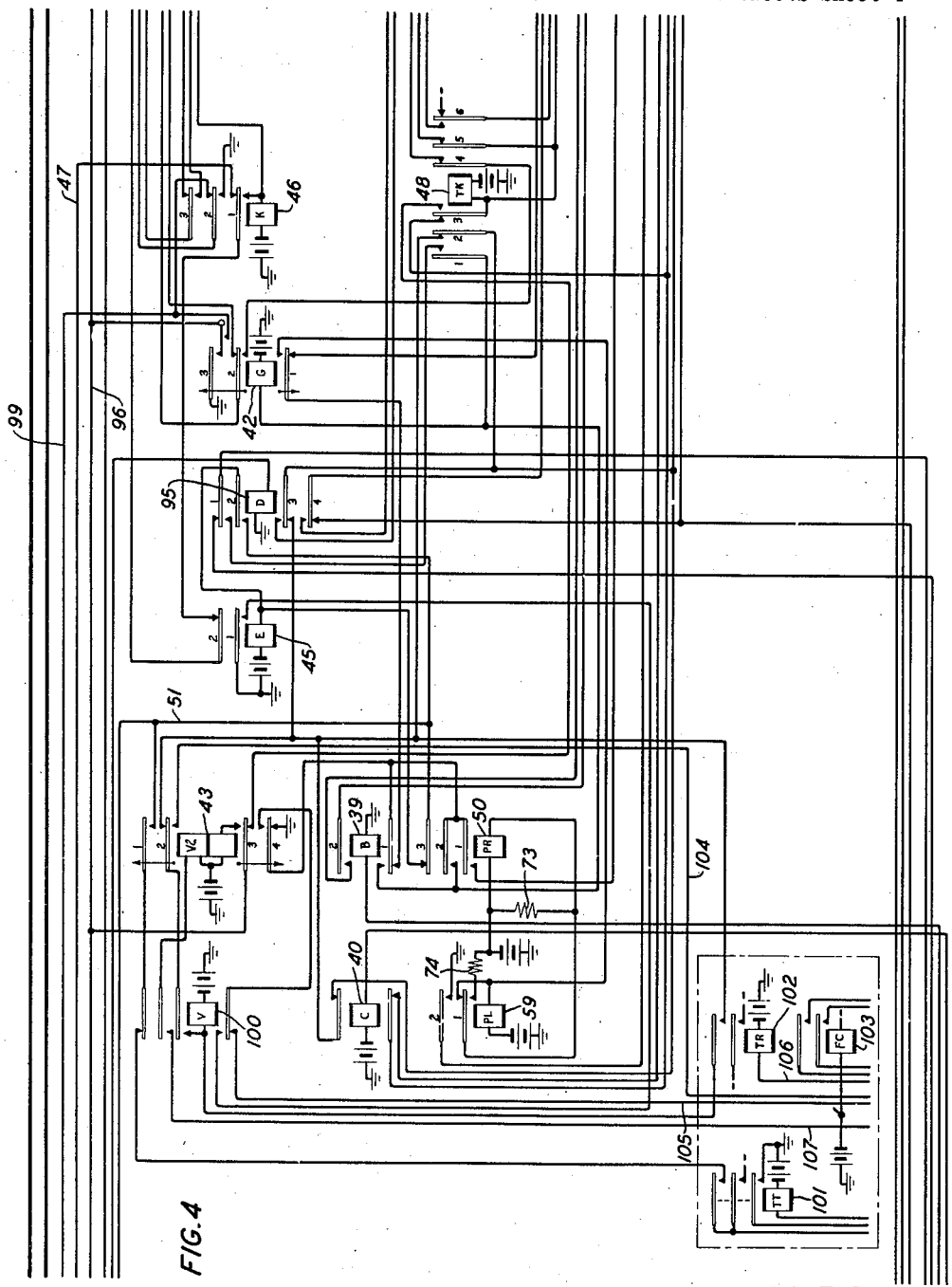
Figure 5:
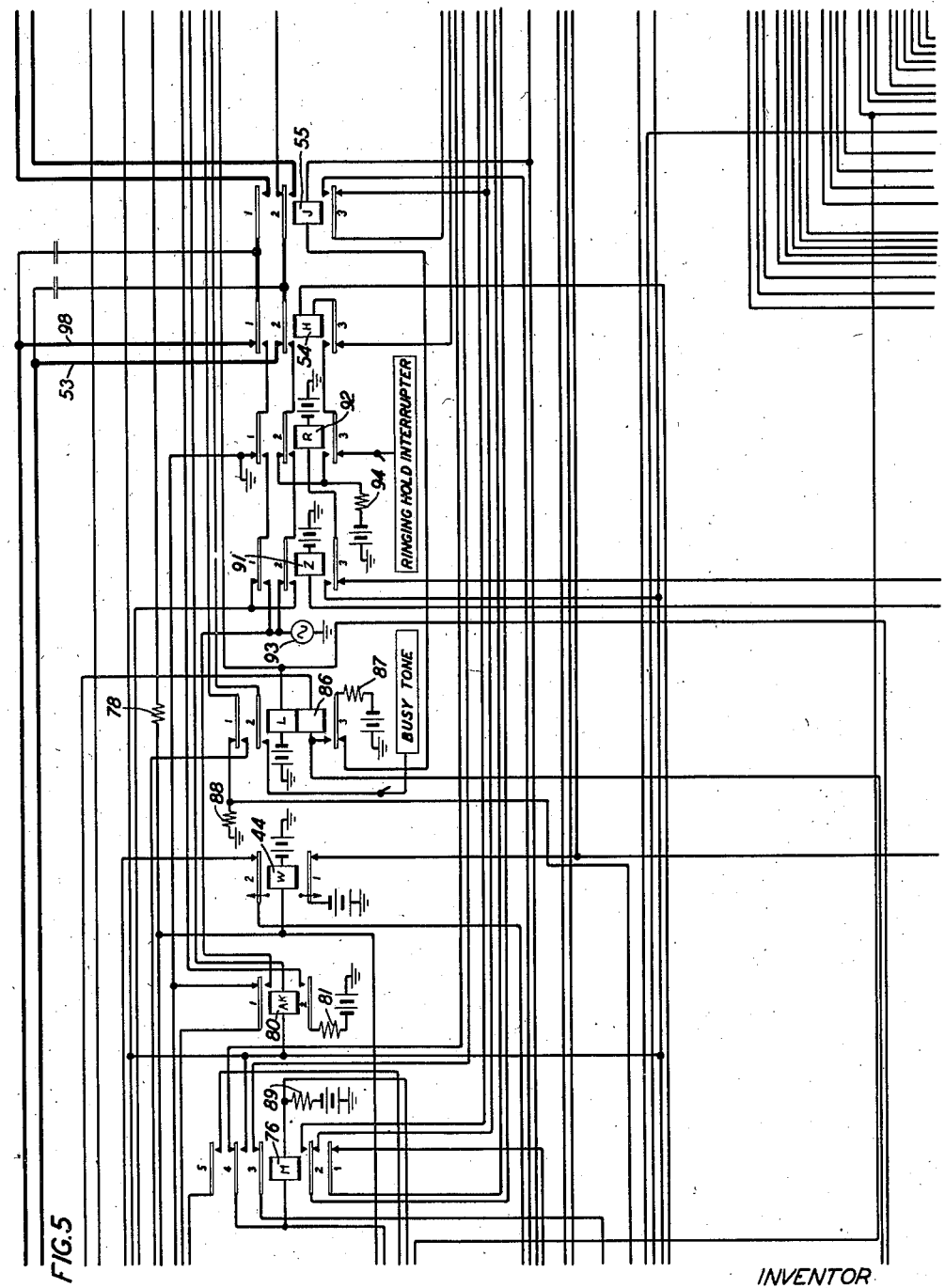
Figure 6:
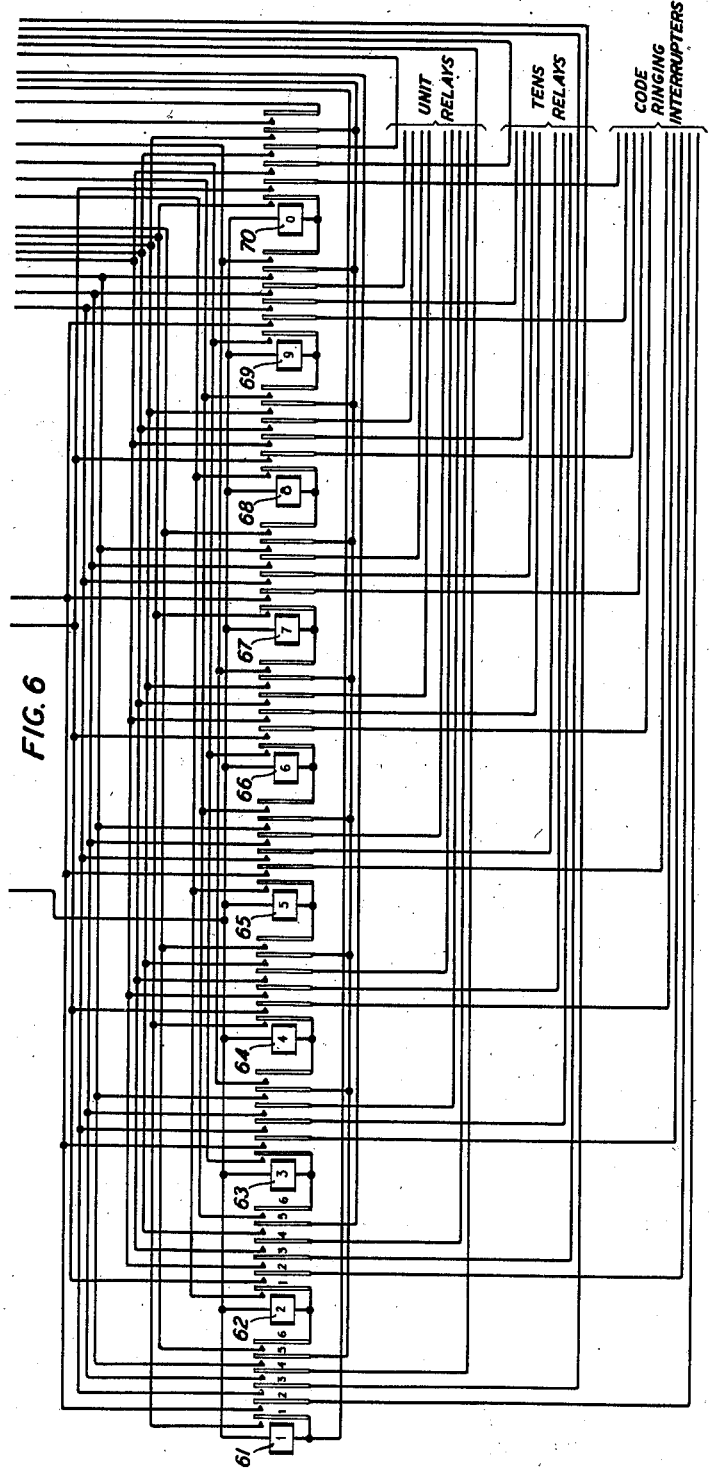

To convert the link to a test connector key 113 is operated. If the link is busy and the key 113 is operated there will be no ground on conductor 47 and hence the relay 110 will not operate. Key 113 closes a circuit from ground, armature 2 and back contact of relay 114, armature 5 and back contact of relay 110 through the contacts of relay 113, armature 1 and back contact of relay 115 through the winding of relay 116 to battery. Relay 116 operates in this circuit and closes a circuit from ground connected to a contact of key 113 through the armature and front contact of relay 116, the winding of relay 115 to battery. The consequent operation of relay 115 opens the circuit for relay 116 whereupon this relay releases, again closing the circuit for relay 115. In this manner relays 115 and 116 alternately operate, the rate of their operation being controlled by their slow-releasing characteristics. During the periods of release of relay 115 a circuit is closed from ground, back contact and armature 2 of relay 115 through the contacts of key 113 to the signal lamp 117 which accordingly flashes to indicate that the link is busy on a regular subscriber's connection and therefore cannot be used for test purposes at this time.

If the link is idle the operation of key 113 closes a circuit for the operation of relay 110 to the ground normally found on the conductor 47. Relay 110, through its armature 1, disconnects ground from conductor 20 which indicates that the link or connector is now busy and prevents its seizure under normal operating conditions. Ground is now placed on the conductor 47 by armature 1 of relay 110 so that relay 110 is permanently energized as long as key 113 is operated. The test lamp 117 will be closed through the contacts of key 113 and the armature 2 and back contact of relay 115 and will burn steadily as a result thereof. The alternate operation of relays 115 and 116 above described will not take place since the described circuit for relay 116 is now opened at the back contact and armature 5 of relay 110.

The operation of relay 110 closes a circuit from the calling end of the connector through normal contacts of armatures 1 and 4 of relay 112 to the contacts of keys 118 and 119. If key 118 is operated to the position shown it will connect the test telephone 120 to the connector circuit. Relay 111 operates through the front contact and armature 7 of relay 110, the armature and back contact of relay 120 to ground. Relay 120 is connected through armature 6 and front contact of relay 110 to the winding of relay 54 but due to the absence of ground does not operate at this time so that relay 111 is operated. Relay 122 operates in a connection from its winding through the front contact and armature 4 of relay 110, the back contact and armature 1 of relay 123 to ground. The operation of relay 122 causes the operation of relay 124. The operation of relay 111 transfers the called end of the connector through back contacts of relay 112, front contacts of relay 124, back contacts of relay 114 and normal contacts of the ringing key 125 to the leads 126 and 127 of the testing circuit. The test telephone is now connected across the calling end of the connector and the testing circuit is extended to the called end of the connector and is prepared for being closed through the link multiple.

Upon dialing the first three digits of a number the connector closes the called line through its units and tens relays to the leads 126 and 127. If the called line is idle the test lamp will continue to burn steadily and the usual tests may be made with the testing circuit which may be connected to the conductors 126 and 127 by the operation of key 119.

The testing circuit consists of a number of keys and a voltmeter for making various tests of a line in the usual manner. The following table will indicate certain tests that may be made. The keys 118, 119, 135, 136, 137 and 138 are shown in what will be termed their normal position. In the following table N will indicate the normal position and O will indicate their operated or alternate positions.

| To test for | 118 | 119 | 135 | 136 | 137 | 138 | Remarks |
|---|---|---|---|---|---|---|---|
| Ground on + conductor | N | O | N | N | N | O | Voltmeter reading |
| Ground on − conductor | N | O | O | N | N | O | Voltmeter reading |
| Battery on + conductor | N | O | N | N | O | O | Voltmeter reading |
| Battery on − conductor | N | O | N | N | O | O | Voltmeter reading |
| Short on line | N | O | N | O | O | O | Voltmeter reading |
| Condenser kick metallic | N | O | N | O | O | O | Repeated operation of key 135 swings voltmeter |
| Condenser kick on + conductor | N | O | N | N | N | O | Repeated operation of key 135 swings voltmeter |
| Condenser kick on − conductor | N | O | O | N | N | O | Repeated operation of key 135 swings voltmeter |
| Test inward to switchboard | O | O | N | N | N | N | Dial from test telephone |
| Call test man on line | N | N | N | N | N | N | Dial from test telephone |
| Ring test bells | N | N | N | N | N | N | Dial reverting call from test telephone |

Since the invention resides not in the testing circuit itself but in the operation of the appliqué circuit and the means provided thereby for connecting the testing circuit to the connector under given conditions, no detailed description of testing methods will be given.

The third wire open test may be made by operating keys 119 and 129. Ground from the front contact and armature 2 of relay 122 will now be connected through the normal contacts of armature 4 of relay 123 which will operate and lock to ground on the front contact and armature 1 of relay 124. The operation of relay 123 transfers the ground on its front contact from the winding of relay 122 to the winding of relay 112. Relay 112 operates and by its armature 5 and back contact opens the private wire 99 to the called line. Relay 112 also opens the testing path from conductors 126 and 127 and through its armatures 1 and 4 connects a bridging resistance 130 across the calling end of the connector in place of the bridge normally supplied by the testing telephone 120. Relay 122 being slow to release releases after relay 112 operates and in turn opens the circuit for relay 124 and places a holding ground through key 129 for holding relay 123 in the same manner as armature 1 of relay 124. Between the time that relay 112 operated and relay 124 released the path between the called line and the terminals 126 and 127 is opened which allowed the lock-out relay and cut-off relay in the line circuit to release. Upon the release of relay 124 the line is closed to the test telephone and the line relay operates after the lock-out relay releases, preventing the line from going on lock-out. The operation of the line relay allows a link to seize the test circuit, reoperates the cut-off and lock-out relays and releases the line relay. The tester may make such observations of the line relay circuit as he thinks necessary and may dial on the line under test.

Upon the release of the key 129 relay 123 releases followed by the release of relay 112 and the reoperation of relay 122 which in turn operates relay 124 as hereinbefore described. The called line must be released by operating the switchhook of the test telephone or operating the key 118 of the test circuit.

Any station on the line under test may be rung by dialing the fourth digit associated with the called line. Upon dialing the fourth or ringing digit the connector counting chain and sequence relays place a ground on relay 54 as hereinbefore described. This ground is extended through the front contact and armature 6 of relay 110, the winding of relay 121 to battery. Relay 121 operates and removes ground from the winding of relay 111. Relay 111 releases and transfers the called line from the testing path to the connector. Presently the code ringing will be applied to the line. When the called station answers relay 95 in the connector will operate and remove ground from relay 54. It also will allow the counting chain and sequence relays to release. Relay 121 being a slow-release type allows the connector relays to restore before releasing and reoperating relay 111. Relay 111 operates and transfers the called line from the connector to the test telephone 120. Talking battery is supplied to the called line from relays 39 and 40 with the test telephone bridged across the line while key 119 is operated in the position shown. The two resistances 131 and 132 in the series with the test telephone prevent it from shunting excessive battery supply from the called station which otherwise would impair the transmission. If the called line is busy or on lock-out due to a permanent or reverting call, after the third digit is dialed a pulse of ground will be supplied to the upper winding of relay 86. Relay 86 operates and locks through its lower winding to battery through resistance 87. The ground pulse reaches relay 114 through contacts of relay 111, the circuit being traced from battery, winding of relay 114, normal contacts of armature 4 of relay 114, front contact and armature 3 of relay 111 and thence to the upper winding of relay 86, the ground pulse coming through the back contact and armature 1 of relay 84 before the units relay 84 has operated. Relay 114 operates, opening its operating path from connection to the winding of relay 86 and locks to ground through its front contact and armature 4 and the front contact and armature 1 of relay 124. Relay 114 in operating places the connector condensers 133 and 134 in series with the testing path to the called line, transfers the steady ground from the test lamp 117 to the starting circuit for relay 116, opens the operating circuit to relay 112, prepares a path for shunting the lower winding of relay 86 and prepares the called line for lock-out removal by extending it to relay 123. Relays 115 and 116 start operating and this changes the steady burning of lamp 117 to a flashing lamp indicating to the test man that he has encountered a busy line. The tester may now listen on the called line and make such inspections as are necessary if it is on lock-out from a permanent or reverting call or whether it is actually busy on a legitimate connection.

The lock-out condition of the line circuit may be released by operating key 129 momentarily. Ground from the front contact of armature 2 of relay 122 is extended through the normal contacts of armature 4 of relay 123 and thence through the winding of this relay to cause its operation. Relay 123 then locks through its armature 4 and front contact to the front contact and armature 1 of relay 124. Relay 123 in operating transfers ground at the back contact of its armature 1 from the winding of relay 122 through the front contacts of its armature 1 and thence over armature 5 and front contact of relay 114 to the lower winding of relay 86 which acts to shunt this winding and to cause the release of relay 86. Relay 123 also places battery through resistance 141, armature 3 and front contact of relay 123, front contact and armature 1 of relay 114 on the negative conductor of the line and through its armature 2 and front contact and front contact and armature 3 of relay 114 places ground on the positive conductor of the line. Relay 122 releases and in turn opens the operating circuit for relay 124. Before this latter relay releases, however, the shunting battery and ground to the line circuit allows the line relay to release and the cut-off relay to operate from ground on the private conductor supplied by the connector. Upon the release of relay 124, relays 123 and 114 become deenergized due to the loss of ground at the front contact of armature 1 of relay 124. If the tester has released key 129, then relays 123 and 114 release otherwise these relays are held from ground on the back contact of armature 2 of relay 122. Upon the release of relay 123, relay 122 reoperates and thereupon reoperates relay 124. The delayed release characteristics of relays 122 and 124 allows a time interval for shunting the line relay and of sufficient duration to release the lock-out irrespective of the time that key 129 was held operated. The called line is now connected to the test circuit and the cut-off relay in the line circuit operated to ground in the connector.

Party line stations with receivers off the hook may be rung by operating key 125. This key connects a source of ringing current 143 through a resistance element 142 on both sides of the line and rings all stations.

Figure 7:
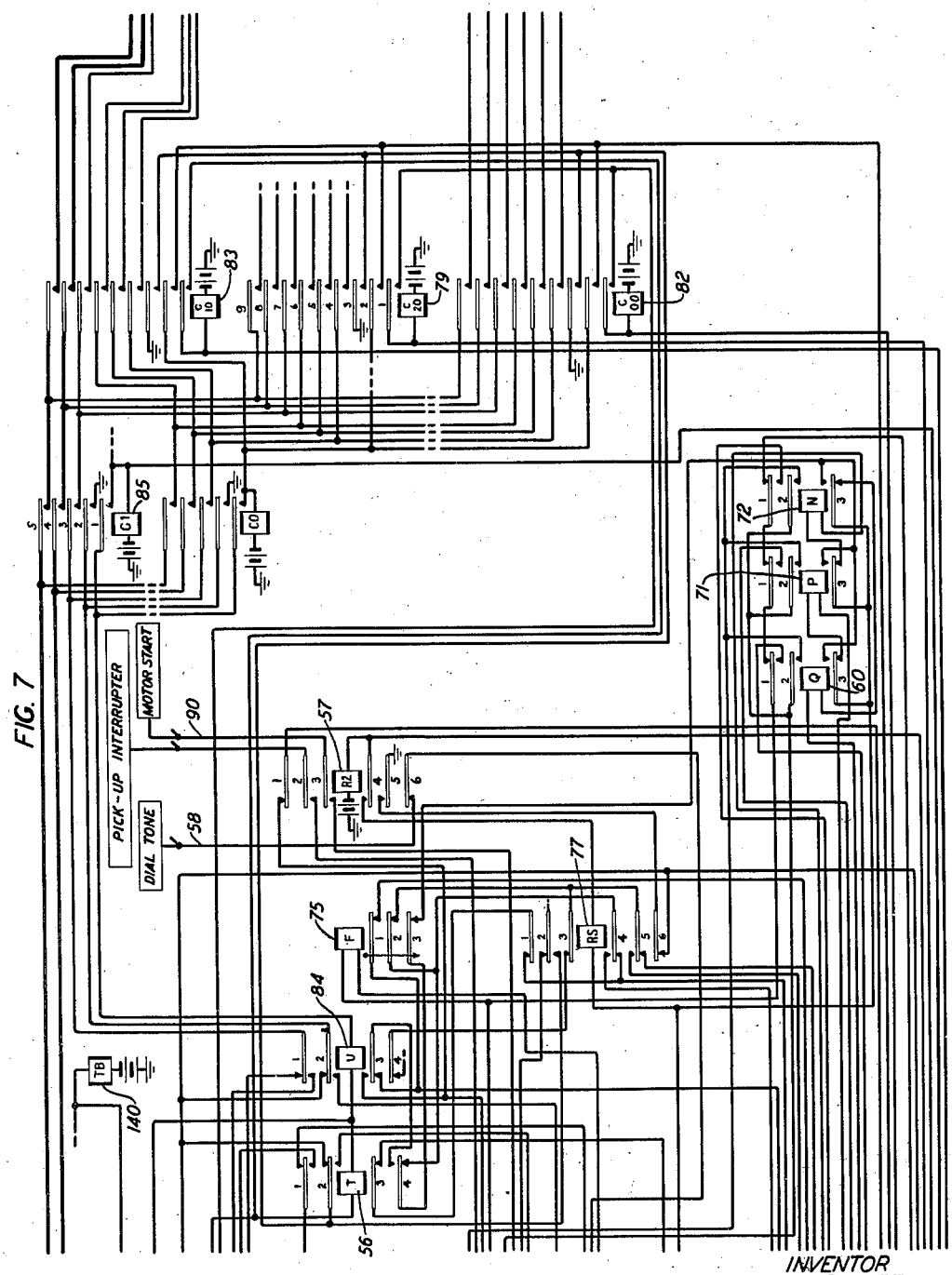

It has been mentioned hereinbefore that the connector may have access to trunk lines. In this connection a trunk blocking relay is furnished in the connector. This is shown as relay 140, its purpose being to bar certain subscribers from access to the trunks. The trunk blocking relay 140 is shown in Fig. 7 merely to show how it is operated from the front contact of armature 8 of relay 110.

Lines on test may be released by operating the switchhook of the test telephone. The test connector may be released and the link restored to service by releasing key 113.

Figure 8:
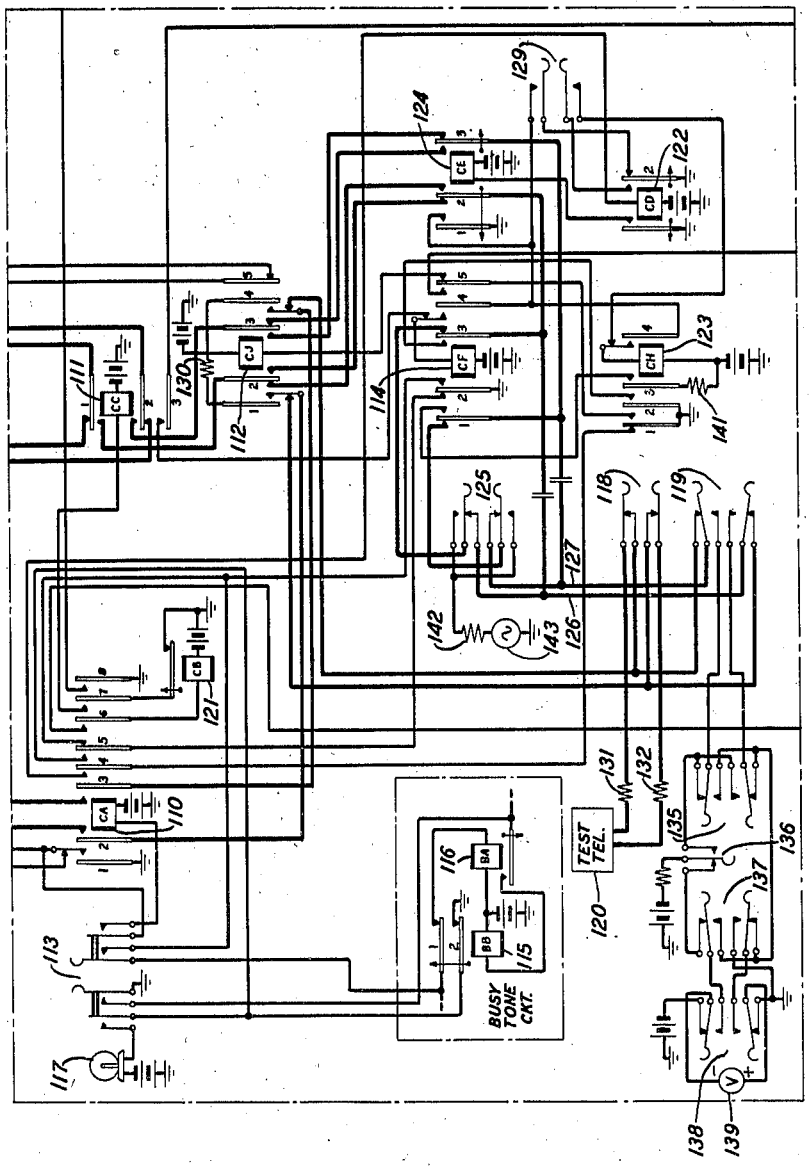
Figure 9:
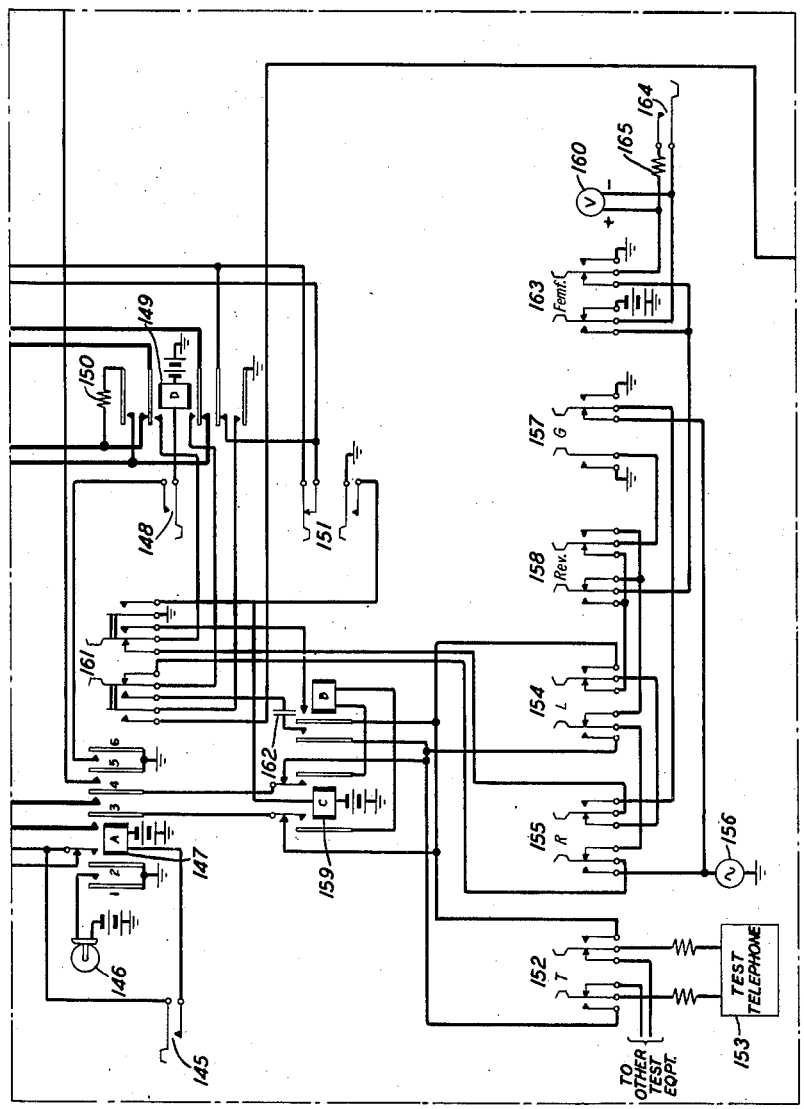

The circuit arrangement of Fig. 9 is designed to permit the same type of testing operation by means of the converted connector as the circuit for Fig. 8. It is however much simpler and may be looked upon as a second species of the present invention.

When the test man wishes to use the connector as a test connector, he will operate key 145. If the connector is in use then this condition will be marked by the absence of ground on the conductor 47 so that the operation of key 145 is ineffective and by the same token the signal lamp 146 will remain unlighted. If the connector, on the other hand, is idle then ground will be found on conductor 47. This will be extended through the contacts of key 145 to the winding of relay 147 whereupon this relay will operate and lock through its front contact and armature 2. Conductor 20 leading to the line finder will be held open so that the connector is now marked in the line finder as being busy. Lamp 146 is included in a circuit with the front contact and armature 1 of relay 147 and this lamp burning steadily will indicate to the test man that the test connector is now in condition to be used for testing purposes. The testing key 148 when operated will close a circuit through armature 6 and front contact of relay 147 through the winding of relay 147 which operates and disconnects the line wires from the called side of the connector and connects them through the test keys to the voltmeter test circuit. A contact of relay 149 also connects a resistance 150 across the positive and negative conductors of the line toward the battery supply relays of the connector to trip the machine ringing and subsequently to set up a called subscriber answer condition to prevent the connector from timing out. Relay 149 in operating also opens the short circuited upper pair of contacts of key 151 so that the latter key can subsequently be operated if desired to open the private conductor of the connector.

To establish a test connection the key 152 is operated to connect the test telephone 153 to the calling side of the test connector. This key should be left operated during the time that the key 145 is operated. If it is desired to ring and talk to a subscriber the testing key 143 can be left in the normal position. On dialing the number the connection is established in the same manner as for a service call from one subscriber to another. If the tester does not desire to ring a subscriber, upon completion of the connection the testing key 148 should be operated before dialing the connection. The test connection is dialed in the regular manner by removing the receiver from the test telephone switchhook and operating the dial. In order that busy tone may not be connected through the test circuit to a service connection when the called line is busy, key 154 of the voltmeter test circuit should always be in the normal position except when its operation is required for certain test features described hereinafter.

If the line is idle as indicated by the absence of busy tone in the test telephone receiver, the usual voltmeter tests can be made with the voltmeter test circuit. If the tester wishes to call the subscriber, key 154 is operated to connect talking battery from the calling side of the connector to the called line and the proper ringing code is rung manually with the ringing key 155. The operation of key 155 alone places ringing current from the source 156 on both sides of the line. If key 157 is operated, then ringing current may be placed on either one side of the line or the other in accordance with the position of the reversing key 158.

The third wire open key 151 is used for checking reported "can't call" or "no dial tone" conditions. When the tester establishes connection to the line the operation of the third wire open key 151 opens the private conductor to release the lock-out and the cut-off relays of the called line circuit. This key also furnishes ground for operating relay 159 which operated to apply a hold condition on the calling side of the connector to release the test telephone for subsequent connection to the called line. With the key 151 operated the voltmeter 160 can be used to test for battery and ground on the line relay through the back contacts of the cut-off relay. The subsequent operation of key 154 of the voltmeter test circuit disconnects the voltmeter and connects the test telephone through the operated contacts of key 152 across the called subscriber line circuit to operate the line relay and dial tone should be heard in the receiver. If desired the tester can dial the call on the subscriber line.

If the tester dials a busy line, the busy tone will be heard in the receiver of the test telephone. The tester can monitor on the connection by operating a monitoring key 161. The operation of this key connects the telephone set through a condenser 162 across the connection and also provides a ground for shunting down the line relay 86 of the connector circuit to disconnect the busy tone. If the tester hears no conversation on the line he can observe the relays of the subscriber line circuit to determine whether the line is being held on lock-out. If this is the case, he can operate the cut-off relay to hold it operated until the line relay releases to remove the shunt from the cut-off relay. The subsequent operation of the cut-off relay disconnects battery and ground from the subscriber line circuit and permits tests to be made with the voltmeter test circuit to determine the cause of the "permanent" condition. The ringing key 155 can be used to ring on the line in an attempt to get a receiver restored to the switchhook. When the key 155 is used, key 154 of the voltmeter test circuit should be operated so that talking battery will be supplied from the calling side of the connector circuit to both the called subscriber and the test telephone to permit conversation after the subscriber answers.

Key 163 in the voltmeter test circuit in its normal position allows the operation of the voltmeter from a local source of battery and in its alternate position allows the operation of the voltmeter from a foreign source of battery.

Due to the high internal resistance of the voltmeter a shunt key 164 is provided to connect a shunt 165 across the terminals of the instrument so that relatively low resistance connections such as "receivers off the hook" may be readily detected.

The arrangement of the voltmeter test circuit of Fig. 9 retains all the test features of the test circuit of Fig. 8.

What is claimed is:

1. In a telephone system, a plurality of subscribers' lines, a plurality of subscriber controlled switches for interconnecting said lines, an auxiliary testing circuit permanently associated with one of said switches, said testing circuit normally arranged to permit said switch to function normally, a switching key for effectively including said testing circuit in said switch and means responsive to a condition in said switch denoting use of said switch in normal service for rendering the operation of said switching key ineffective.

2. In a telephone system, a plurality of subscribers' lines, subscriber controlled selectors and connectors for interconnecting said lines, an auxiliary testing circuit permanently associated with one of said connectors for converting said connector into a test connector, manually operable means for rendering said auxiliary circuit effective and means in said connector responsive to its use in normal service for rendering the operation of said manual means ineffective.

3. In a telephone system, a plurality of subscribers' lines, subscriber controlled switches for interconnecting said lines, an auxiliary testing circuit permanently associated with one of said switches for use in testing said lines, a relay for connecting said auxiliary testing circuit to said associated switch, a manually operable key and means in said switch responsive to a normal busy condition thereof for controlling said relay and a signal associated with said manually operable key rendered operative by said key and responsive to the normal busy condition of said switch.

4. In a telephone system, a plurality of subscribers' lines, subscriber controlled switches for interconnecting said lines, an auxiliary testing circuit permanently associated with one of said switches for use in testing said lines, a relay for connecting said auxiliary testing circuit to said associated switch, a manually operable key for operating said relay, means in said switch denoting an idle condition thereof for rendering the operation of said key effective and a signal associated with said key responsive to the operation of said relay to indicate the effect of the operation of said key.

JOHN NICHOLSON RELFE.